(12) United States Patent
Wilson et al.

(10) Patent No.: US 10,935,689 B2
(45) Date of Patent: Mar. 2, 2021

(54) INDUCTION TRANSCEIVER WITH ELECTROMAGNETIC SENSITIVE GAP

(71) Applicant: Halliburton Energy Services, Inc., Houston, TX (US)

(72) Inventors: Glenn Andrew Wilson, Houston, TX (US); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 56 days.

(21) Appl. No.: 16/315,352

(22) PCT Filed: Aug. 9, 2016

(86) PCT No.: PCT/US2016/046125
§ 371 (c)(1),
(2) Date: Jan. 4, 2019

(87) PCT Pub. No.: WO2018/030995
PCT Pub. Date: Feb. 15, 2018

(65) Prior Publication Data
US 2019/0243021 A1 Aug. 8, 2019

(51) Int. Cl.
*G01V 3/28* (2006.01)
*E21B 47/00* (2012.01)
*E21B 47/09* (2012.01)

(52) U.S. Cl.
CPC ............... *G01V 3/28* (2013.01); *E21B 47/00* (2013.01); *E21B 47/09* (2013.01)

(58) Field of Classification Search
CPC ............ G01V 3/28; E21B 47/00; E21B 47/09
See application file for complete search history.

(56) References Cited

U.S. PATENT DOCUMENTS

| | | |
|---|---|---|
| 5,268,879 A | 12/1993 | Flanagan |
| 5,914,598 A | 6/1999 | Sezginer et al. |
| 6,249,259 B1 | 6/2001 | Goodman et al. |
| 2005/0088342 A1 | 4/2005 | Parsche |
| 2006/0208738 A1* | 9/2006 | Moore ............... G01V 3/24 324/344 |
| 2015/0137817 A1 | 5/2015 | Wilson et al. |
| 2017/0342822 A1* | 11/2017 | Wilson ............... E21B 47/09 |

OTHER PUBLICATIONS

PCT Application Serial No. PCT/US2016/046125, International Search Report, dated May 2, 2017, 3 pages.
PCT Application Serial No. PCT/US2016/046125, International Written Opinion, dated May 2, 2017, 9 pages.

* cited by examiner

*Primary Examiner* — Reena Aurora
(74) *Attorney, Agent, or Firm* — Gilliam IP PLLC

(57) ABSTRACT

An induction transceiver system includes a magnetic core and an insulator surrounding the magnetic core. The system further includes a cylindrically-shaped sleeve substantially surrounding the insulator. The sleeve includes a gap along the length of the sleeve. A potential difference is measured across the gap when receiving, and a current is applied across the gap when transmitting.

19 Claims, 6 Drawing Sheets

FIG. 3A
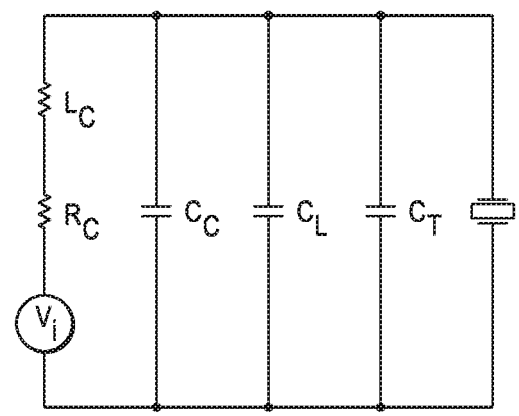
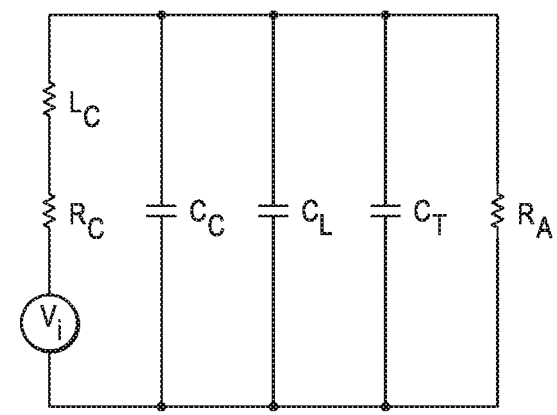
FIG. 3B

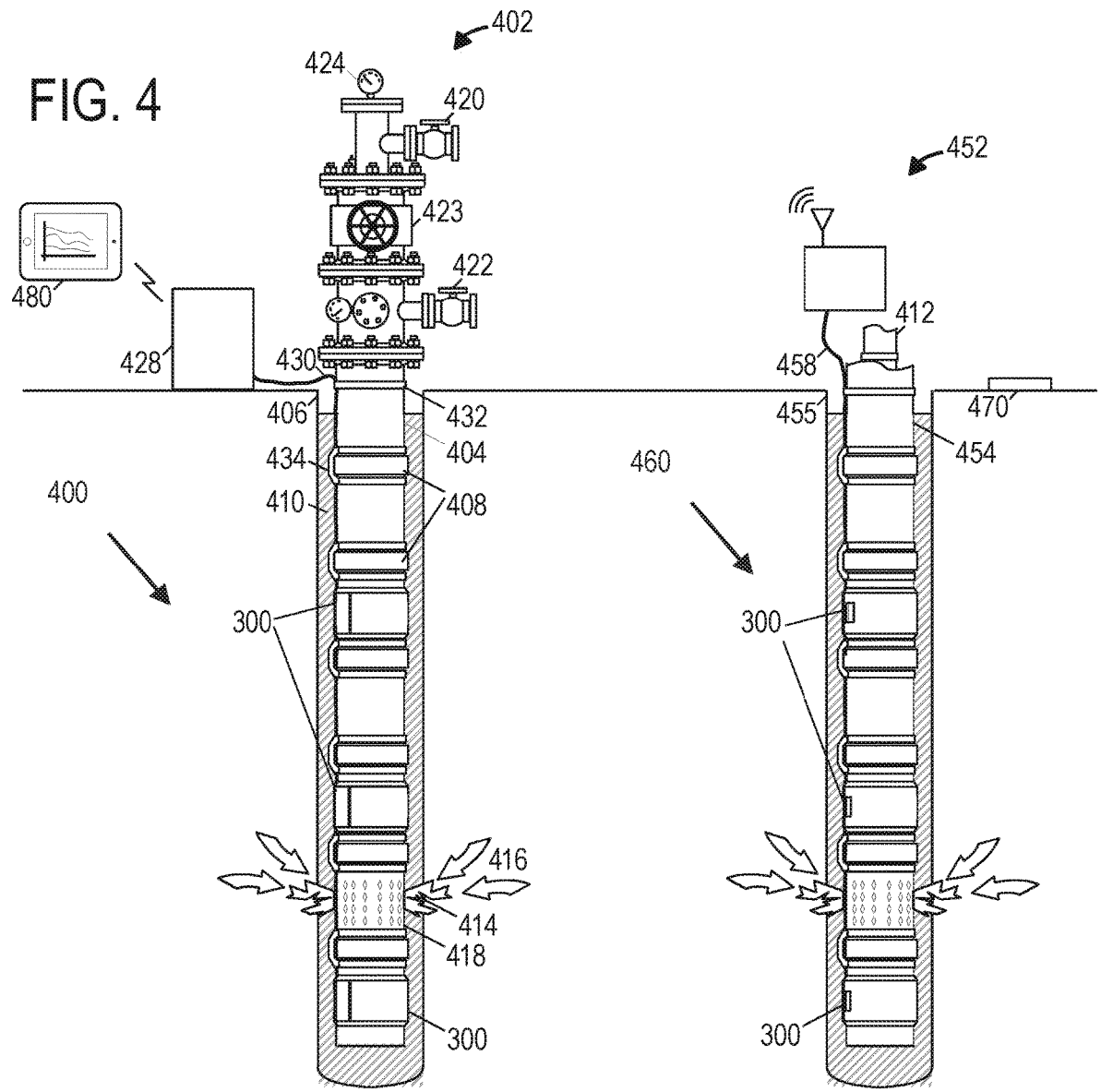

INDUCTION TRANSCEIVER WITH ELECTROMAGNETIC SENSITIVE GAP

BACKGROUND

In the oil and gas industry, field operators are faced with the challenge of maximizing hydrocarbon recovery within a given budget and timeframe. While they perform as much logging and surveying as feasible before and during the drilling and completion of production and, in some cases, injection wells, the information gathering process does not end there. It is desirable for the operators to track the movement of fluids in and around the reservoirs, as this information enables them to adjust the distribution and rates of production among the production and/or injection wells to avoid premature water breakthroughs and other obstacles to efficient and profitable operation. Moreover, such information enables the operators to better evaluate treatment and secondary recovery strategies for enhanced hydrocarbon recoveries.

The fluid saturating the formation pore space is often measured in terms of a hydrocarbon fraction and a water fraction. Due to the solubility and mobility of ions in water, the water fraction lends itself to indirect measurement via a determination of formation resistivity. The ability to remotely determine and monitor formation resistivity is of direct relevance to long term reservoir monitoring, particularly for enhanced oil recovery operations with water flooding and/or carbon dioxide injection. Hence, a number of systems have been proposed for performing such remote formation resistivity monitoring using coiled-wire antennas. Such antennas are constructed using wires wrapped around a magnetic core forming a multi-turn loop or a solenoid. For a fixed loop diameter, sensitivity increases as the number of turns and the wire length increases. However, as the number of turns and wire length increases, adverse electromagnetic effects, such as parasitic capacitance, and adverse physical effects, such as damage to the antenna due to the harsh downhole environment, increase as well. Additionally, the cost to manufacture, maintain, and service increase as the number of turns and wire length increases.

BRIEF DESCRIPTION OF THE DRAWINGS

Accordingly, to mitigate or eliminate the adverse electromagnetic and physical effects as well as decrease cost to manufacture, maintain, and service multi-turn loop antennas, induction transceiver systems and methods are disclosed herein. In the following detailed description of the various disclosed embodiments, reference will be made to the accompanying drawings in which:

FIGS. 3A and 3B are equivalent circuit diagrams of illustrative induction transceiver sleeves;

FIG. 4 is a side view of illustrative systems of induction transceivers within boreholes as part of a casing string and fastened externally to a casing string;

Figure 1:
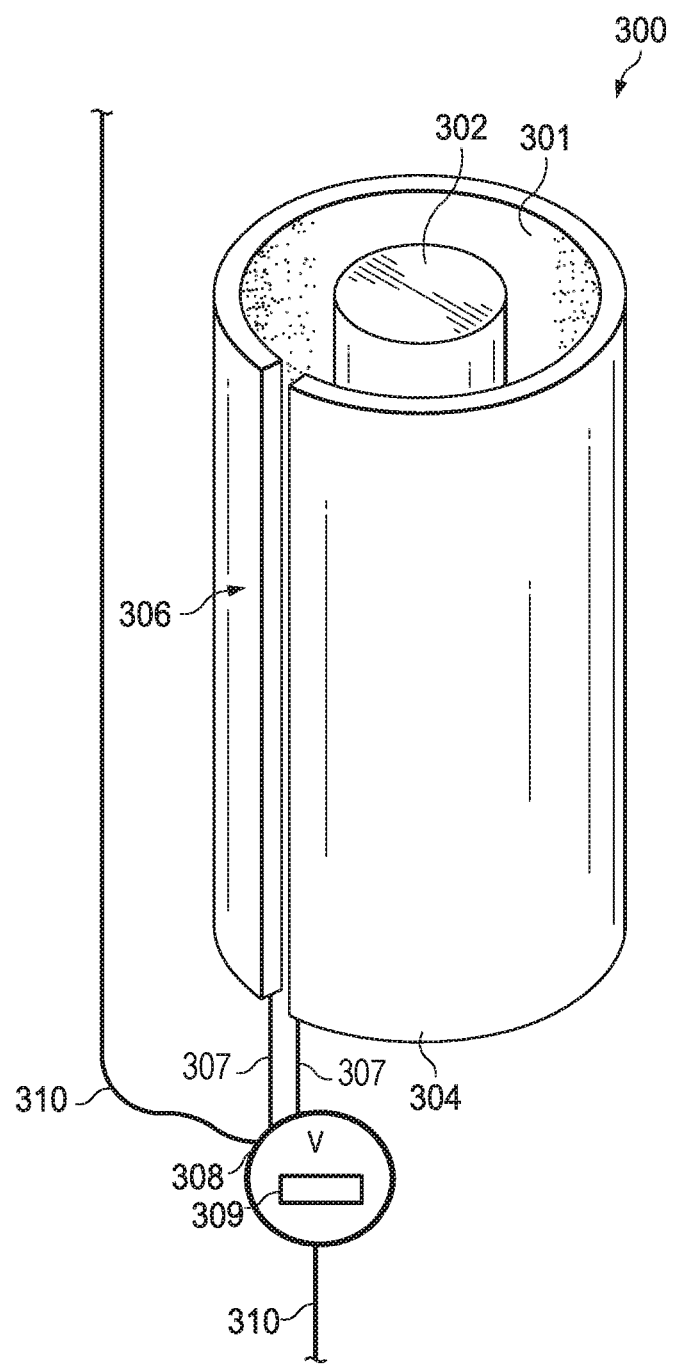
FIG. 1 is an isometric view of an illustrative induction transceiver.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

Notation and Nomenclature

Certain terms are used throughout the following description and claims to refer to particular system components and configurations. As one of ordinary skill will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by systems and methods including induction transceivers. By eliminating coil windings and active electronic components, such as amplifiers, from downhole antennas, induction transceivers may be used in a wide variety of environments without sacrificing performance. Additionally, when combined with optical fiber interrogation, induction transceivers provide electromagnetic reservoir monitoring systems with improved sensitivity and hence result in improved accuracy of reservoir models.

FIG. 1 is an isometric view of an induction transceiver 300 coupled to an armored cable 310 including electrical conductors for supplying power for transmission and for carrying any measurement data. The induction transceiver 300 may be included in a downhole tool such as a logging-while-drilling ("LWD") tool, resistivity tool, included in a casing string, externally fastened to a casing string, and the like as described in the embodiments below. The illustrative transceiver 300 includes a magnetic core 302 and an insulator 301 surrounding the magnetic core 302. The magnetic core 302 preferably includes a resistive, magnetically permeable material. For example, the magnetic core 302 may be formed of a ferrite, mu-metal, permalloy, or metal glass material. The insulator 301 is a resistive, preferably non-magnetic, low permittivity material. For example, the insulator may be a layer of poly-ether-ether-ketone.

The transceiver 300 also includes a cylindrically-shaped conductive sleeve 304 (with open ends) that substantially surrounds the insulator 301. The sleeve 304 is a layer of conductive metal. For example, the sleeve 304 material may include copper, copper alloy, or steel. The sleeve 304 includes a gap 306 that runs along the length of the sleeve 304. Because of the gap 306, the sleeve 304 does not provide a conductive path that fully encloses the insulator 301. As shown, the gap 306 is parallel to the cylindrical axis of the sleeve 304 and traverses the sleeve 304 in a vertical line, but in various embodiments the gap 306 has different orientations. For example, the gap 306 may traverse the sleeve 304 in a diagonal line. As such, the gap 306 would curve around the cylinder according to the slope of the line. The gap 306 may also traverse the sleeve 304 in a curve or an irregular shape in various embodiments.

The transceiver 300 also includes a voltage module 308, which includes two leads 307 coupled to separate sides of the gap 306. The voltage module 308 measures potential difference across the gap, using the leads, when the transceiver 300 is receiving, and the voltage module 308 applies a current across the gap, using the leads, when the transceiver 300 transmitting. The current may be modulated by the voltage module 308. The magnetic core 302 enhances the gap voltage's sensitivity to receive EM signals and enhances the gap voltage's gain for transmitting EM signals.

The transceiver 300 may be used with other EM sources and EM receivers to facilitate collection and recording of measurements for reservoir monitoring such as resistivity measurements. Specifically, the measurements collected by transceiver 300 may be sensitive to formation resistivity, which is an indicator of changing fluid saturation and the movement of fluids within a reservoir. As the formation resistivity changes, changes in transmitted electromagnetic fields induce varying potential differences across the gap 306 measured by the voltage module 308. In at least one embodiment, the transceiver 300 transmits measurement data over the cable 310. For example, the cable 310 may be an optical fiber or include an optical fiber. Accordingly, the voltage module 308 may modulate an optical fiber response. In order to communicate, the voltage module 308 includes a transducer 309 that responds to potential differences across the gap 306.

The transducer 309 may be an electro-restrictive material that deforms in proportionate response to potential differences across the gap. For example, the electro-restrictive material may be a lithium niobate, piezoelectric, or ferroelectric material. Due to coupling or bonding between the electro-restrictive material and the optical fiber, the deformation causes proportional strain in the optical fiber, and the strain may be detected by interrogating the optical fiber using interrogation techniques such as interferometric, fiber Bragg grating (FBG), fiber laser strain (FLS), and extrinsic Fabry-Perot interferometric (EFPI) techniques. For example, a known signal may be transmitted through the optical fiber, and the signal may be altered or reflected by the strain on the optical fiber. The altered or reflected signal may be measured, and the potential differences across the gap 306 may be derived from the type and amount of alteration by the data processing system discussed above.

The transducer 309 may be an electro-optical element such as a light-emitting diode ("LED"), and the optical fiber may be used to measure the intensity of the electro-optical element. For example, the intensity of the LED may be proportionally responsive to the potential differences across the gap 306, and the LED may be coupled to the optical fiber such that light emitted by the LED travels through the optical fiber. The light may be measured, and the potential differences across the gap 306 may be derived from the intensity of the light, by the data processing system discussed above.

Figure 2A:
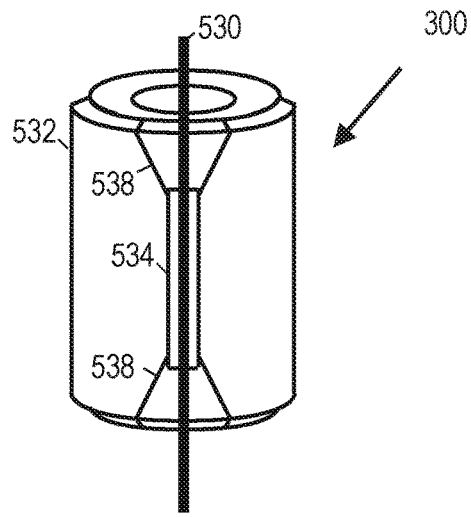
FIGS. 2A and 2B are isometric views of illustrative induction receivers.
Figure 2B:
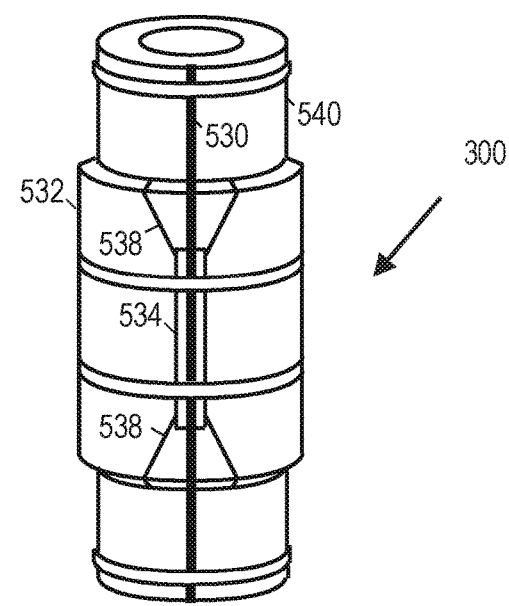

FIG. 2A shows an alternative embodiment of an induction transceiver 300 operating as a receiver or in receiving mode. An optical fiber 530 response is proportional to an electric field sensing element 534. For example, the electric field sensing element 534 may be an electro-restrictive or piezoelectric material that modulates the strain in the optical fiber 530 in relation to the sensed field. A conductive layer 532 over a core or layer of high-permeability material supplies the gap voltage (i.e., electric field) across the element 534, modulating the response of the optical fiber 530. Nonconductive inserts 538 are provided to modify the shape of the field across the element 534, and thereby improve the element's 534 performance. FIG. 2B illustrates such a transceiver 300 included in a casing string 540.

FIG. 3A shows an equivalent circuit diagram that models an induction transceiver sleeve, e.g. sleeve 304. The inductance, resistance, and capacitance of the sleeve 304 are $L_c$, $R_c$, and $C_c$ respectively. The open circuit voltage induced across the gap is $V_i$. The combined capacitance of the line coupling the sleeve 304 and the electro-optical transducer is $C_L$. The capacitor $C_T$ is a capacitance that may be deliberately added to form a parallel resonant circuit with the sleeve. FIG. 3B shows an equivalent circuit diagram that models an induction transceiver sleeve 304 coupled to an electro-optical transducer for modulating the response of an optical fiber as described with respect to FIGS. 2A and 2B. The electro-optical transducer may be a lithium nobate characterized by an internal resistance RA (e.g., on the order of megaohms) and a capacitance $C_a$ (e.g., on the order of picoFarads).

One or more induction transceivers 300 may be used as part of a permanent electromagnetic reservoir monitoring system and may be deployed on the surface or in single or multiple wells as illustrated in FIG. 4. FIG. 4 shows a well 402 equipped with a permanent electromagnetic ("EM") monitoring system 400. The illustrated well 402 has been constructed and completed. It includes a casing string 404 positioned in a borehole 406 that has been formed in the earth by a drill bit. The casing string 404 includes multiple casing tubulars (usually 30 foot long carbon steel tubulars) connected end-to-end by couplings 408. Alternative casing types include continuous tubing and, in some rare cases, composite (e.g., fiberglass) tubing. Cement 410 has been injected between an outer surface of the casing string 404 and an inner surface of the borehole 406 and allowed to set. The cement enhances the structural integrity of the well and seals the annulus around the casing against undesired fluid flows. Though well 402 is shown as entirely cemented, in practice certain intervals may be left without cement, e.g., in horizontal runs of the borehole where it may be desired to facilitate fluid flows. Cement 410 does not obstruct operation of induction transceivers 300 or optical fibers even when such transceivers 300 are externally fastened to the casing string 404.

Perforations 414 have been formed at one or more positions along the borehole 406 to facilitate the flow of a fluid 416 from a surrounding formation into the borehole 406 and thence to the surface. The casing string 404 may include pre-formed openings 418 in the vicinity of the perforations 414, or it may be perforated at the same time as the formation. Typically, the well 402 is equipped with a production tubing string positioned in an inner bore of the casing string 404. (A counterpart production tubing string 412 is visible in the cut-away view of well 452.) One or more openings in the production tubing string accept the borehole fluids 416 and convey them to the earth's surface and onward to storage and/or processing facilities via a production outlet 420. The well head may include other ports such as port 422 for accessing the annular space(s) and a blowout preventer 423 for blocking flows under emergency conditions. Various other ports and feed-throughs are generally included to enable the use of external sensors 424 and internal sensors (not shown). Note that this well configuration is merely for illustrative purposes, is not to scale, and is not limiting on the scope of the disclosure.

The interface system 428 typically supplies power and provides data acquisition and storage, possibly with some amount of data processing. The permanent EM monitoring system 400 includes an optical fiber 430 coupled to the interface system 428, and the optical fiber 430 is attached to the exterior of casing string 404 by straps or clamps 432 and protectors 434. (Protectors 434 guide the optical fiber 430 over the couplings 408 and shield the optical fiber 430 from being pinched between the coupling and the borehole 406 wall.) The optical fiber 430 is coupled to one or more induction transceivers 300 included in the casing string 404 and can be used for interrogation as described above.

FIG. 4 also shows a second well 452 having a second casing string 454 in a borehole 455, with one or more induction transceivers 300 attached to the casing string and communicating via one or more optical fibers 458 to a second permanent EM monitoring system 460. Here, the induction transceivers 300 are external to the casing string, and fastened to the outside of the casing string, instead of being included in the casing string. The second permanent EM monitoring system 460 may be connected in a wired or wireless fashion to the first permanent EM monitoring system 400 or to a central system that coordinates the operation of the wells. Additional wells and systems also may be included in the coordinated operation.

FIG. 4 also shows a computer 480 that communicates wirelessly with the well interface system 428 to obtain and process EM measurement data and to provide a representative display of the information to a user. For example, reservoir measurement data may be processed and a reservoir model may be shown to the user. The computer 480 (shown as a tablet or smartphone) may take different forms including a laptop, desktop computer, and virtual cloud computer. Whichever computer embodiment is employed includes software that configures the computer's processor(s) to carry out the necessary processing and to enable the user to view and preferably interact with a display of the resulting information. The processing includes at least compiling a time series of measurements to enable monitoring of the time evolution, but may further include the use of a geometrical model of the reservoir that takes into account the relative positions and configurations of the induction transceivers 300.

Figure 5:
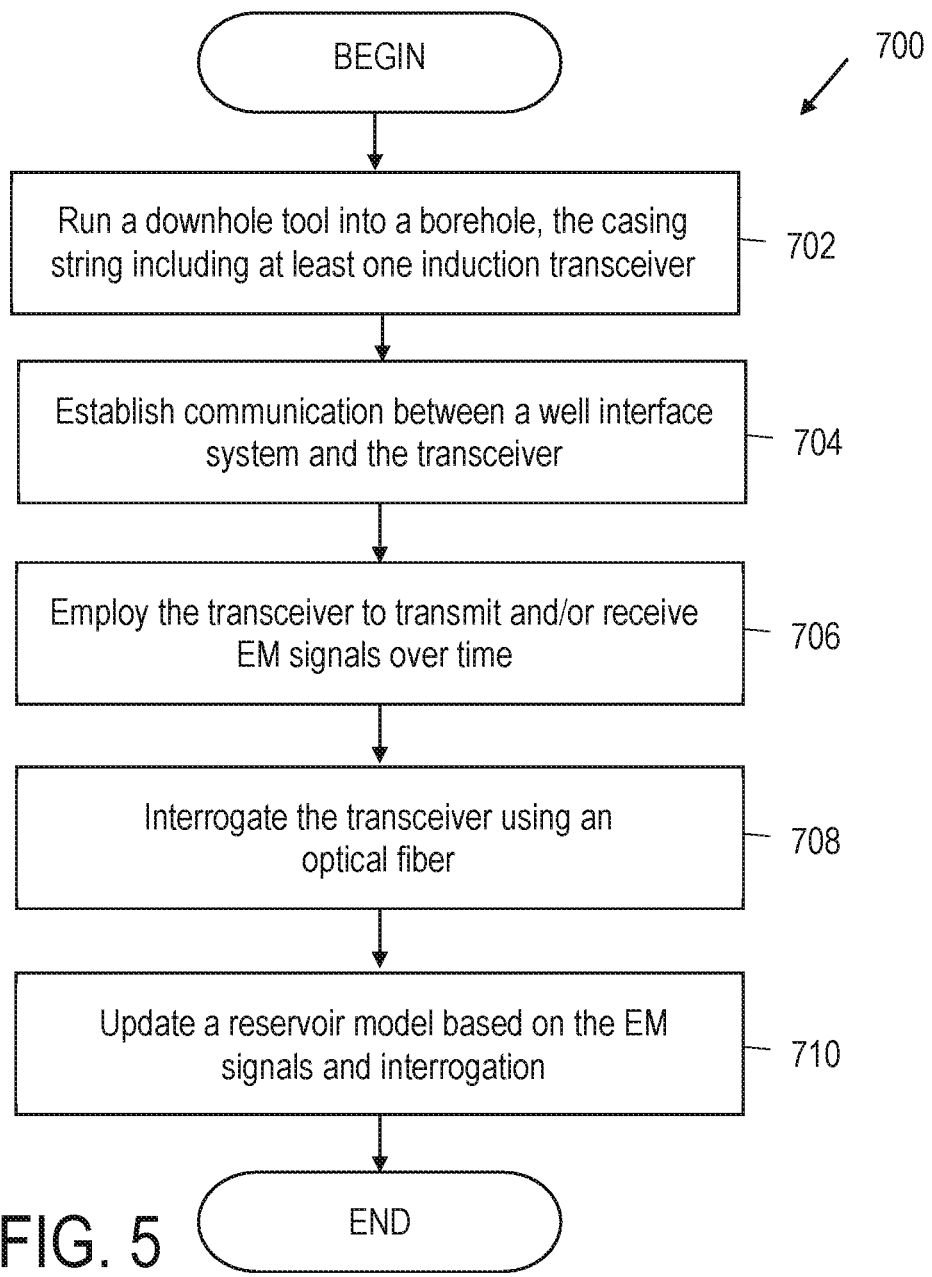
FIG. 5 is a flow diagram of an illustrative electromagnetic monitoring method using one or more induction transceivers.

FIG. 5 is a flow diagram of a permanent electromagnetic monitoring method 700. At 702, operators run a downhole tool into a borehole. As described below, the downhole tool may be a resistivity tool, a logging-while-drilling tool, included in a well casing string, or fastened externally to a well casing string. The downhole tool includes at least one induction transceiver 300 as described above. At 704, a well interface system establishes communication with one or more induction transceivers 300. The well interface system may be the data processing system 50 described below including one or more processors at the surface, downhole, or both. The well interface system may further include an optical fiber (described as a specific embodiment of cable 310 above) and optical equipment coupled to the optical fiber used to interrogate the transducer 309.

At 706, the transceiver 300 is actuated to transmit and/or receive EM signals over time. As reservoir fluids move, the change in the collected EM signals over time may reflect such movement.

At 708, the well interface system interrogates the transceiver 300, using the cable 310, automatically or on command. In at least one embodiment, interrogating the transducer includes measuring a strain on the optical fiber (described as a specific embodiment of cable 310 above) caused by the transducer as described above. In another embodiment, interrogating the transducer includes measuring an intensity of light within the optical fiber caused by the transducer as also described above. For example, Fiber Bragg grating technology may be used. Specifically, a single-mode optical fiber with a known Bragg grating may be stretched by an external force causing deviation of grating period that may be measured. For example, if a tensile force of 1 kg is applied to standard single-mode 9/125 optical fiber, it will be stretched by 0.82%, and the light wavelength reflected from the grating shifts from about 39 nm to 1550 nm. Similarly, double or triple-grating measurements may be taken, and multi-wavelength light sources may be utilized for accuracy.

In at least one other embodiment, Fabry-Perot interferometer technology may be used. Specifically, strain applied to the fiber stretches a small gap in the fiber, which may be measured. Specifically, the wavelength of the light reflected from the gap is shifted, and the shift may be measured. In at least one other embodiment, Brillouin scattering technology may be used. Specifically, scattered light produced by an incident light launched into the fiber may be measured by light detectors. Such scattered light is proportional to the strain on the fiber.

Figure 6:
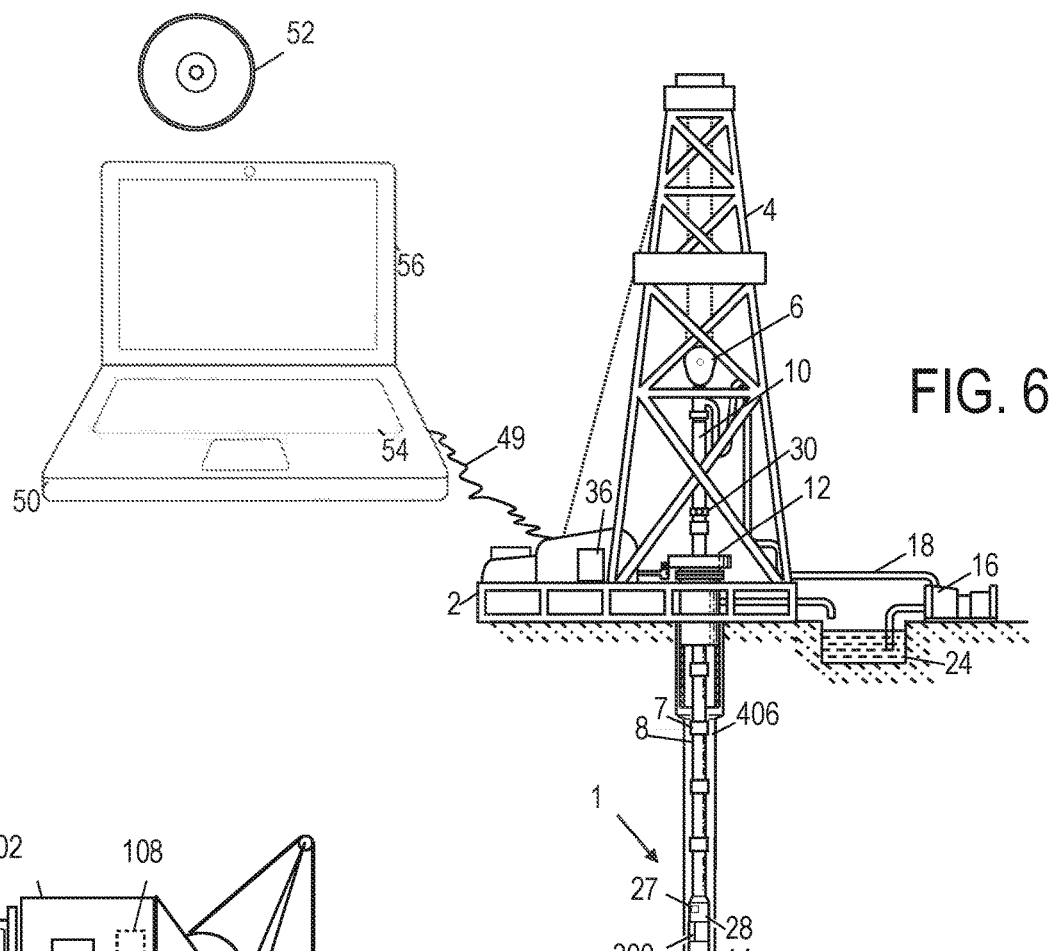
FIG. 6 is a contextual view of an induction transceiver used in an illustrative logging while drilling environment.

At 710, the well interface system updates a reservoir model based on the interrogation and, consequently, based on the EM signals. For example, the movement of reservoir fluids may be recorded as a function of time. The well interface system may also display the reservoir model to operators as a function of time. For example, the computer monitors of the data processing system may be used to display pictures or videos of the reservoir model, and the operators may interact with the display in order to increase or decrease the speed of playback, highlight areas of interest, and other user interface operations. Accordingly, the operators may base field decisions based on the updated model. FIG. 6 shows a well during drilling operations that includes an induction transceiver system 1 including an induction transceiver 300 and one or more processors 27 (located downhole as shown, at the surface, or both). Use of the induction transceiver 300 in such an environment enables elimination of coil windings and active electronic components, such as amplifiers, from downhole antennas, without sacrificing performance.

A drilling platform 2 is equipped with a derrick 4 that supports a hoist 6. While FIG. 6 depicts drilling platform 2 as being disposed on land, in at least some embodiments, the platform 2 may be located offshore for subsea drilling. Drilling of oil and gas wells is carried out by a string of drill pipes connected together by "tool" joints 7 so as to form a drill string 8. The hoist 6 suspends a kelly 10 that lowers the drill string 8 through a rotary table 12. Connected to the lower end of the drill string 8 is a drill bit 14. The bit 14 is rotated and drilling of the borehole 406 is accomplished by rotating the drill string 8, by use of a downhole motor near the drill bit, or by both methods.

Drilling fluid, termed "mud", is pumped by mud recirculation equipment 16 through a supply pipe 18, through the kelly 10, and down through the drill string 8 at high pressures and volumes to emerge through nozzles or jets in the drill bit 14. The mud then travels back up the hole via the annulus formed between the exterior of the drill string 8 and the borehole 406 wall, through a blowout preventer, and into a mud pit 24 on the surface. On the surface, the drilling mud is cleaned and then recirculated by recirculation equipment 16.

For a logging while drilling ("LWD") environment, downhole sensors may be located in the drillstring 8 near the drill bit 14. The sensors may include directional instrumentation and LWD tools. The directional instrumentation measures the inclination angle, the horizontal angle, and the azimuthal angle (also known as the rotational or "tool face" angle) of the LWD tools. As is commonly defined in the art, the inclination angle is the deviation from vertically downward, the horizontal angle is the angle in a horizontal plane from true north, and the tool face angle is the orientation (rotational about the tool axis) angle from the high side of the well bore. In some embodiments, directional measurements are made as follows: a three axis accelerometer measures the earth's gravitational field vector relative to the tool axis and a point on the circumference of the tool called the "tool face scribe line." (The tool face scribe line is drawn on the tool surface as a line parallel to the tool axis.) From this measurement, the inclination and tool face angle of the LWD tool can be determined.

In some embodiments, downhole sensors are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetered signals to an acquisition module 36 coupled to a data processing system 50.

The data processing system 50 may be coupled to a measurement unit on the platform 2 by a wired connection 49 or wireless connection, and may periodically obtain measurement data from the measurement unit as a function of position and/or time. Among other things, the system 50 processes data received from the acquisition module 36 and generates a representative display for the driller to perceive. For example, the induction transceiver system 1 may be used to collect and record reservoir measurement data during drilling. Such data may be used by the data processing system 50 to update a reservoir model from which many decisions may be made. For example, decisions regarding feasibility, geosteering, fracturing, and the like may be enhanced or adjusted based on an updated reservoir model.

Software (represented by information storage media 52) may run on the data processing system 50 to collect the data and organize it in a file or database stored on non-transient information storage media. Specifically, a processor coupled to memory may execute the software. The software may respond to user input via a keyboard 54 or other input mechanism to display data as an image or movie on a monitor 56 or other output mechanism. The software may process the data to optimize field operations as described below. In at least one embodiment, the data processing system 50 is located downhole within a housing able to protect the system 50 from the harsh downhole environment. In another embodiment, processors both at the surface and downhole may work together or independently to obtain, store, and process measurement data.

Figure 7:
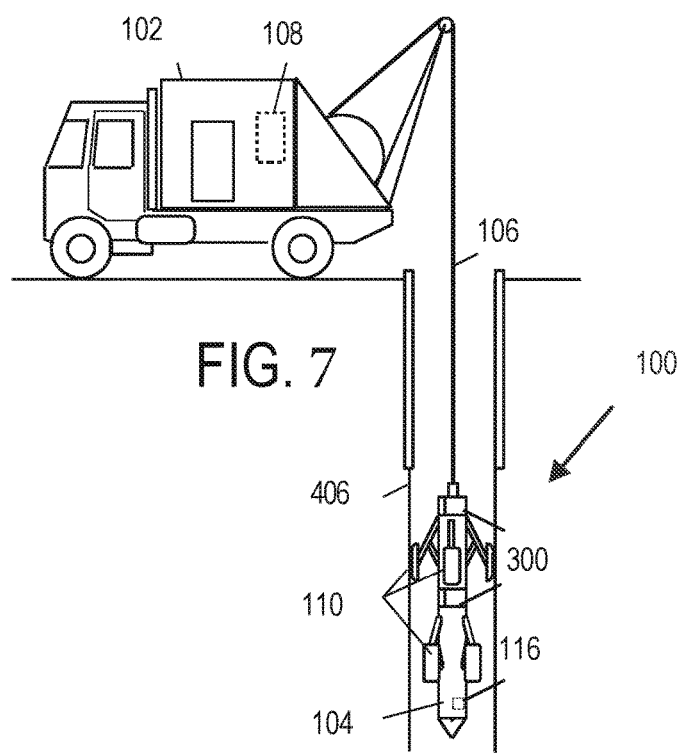
FIG. 7 is a contextual view of an induction transceiver used in an illustrative wireline embodiment.

FIG. 7 shows a contextual view of a wireline embodiment that includes an induction transceiver system 100 including a resistivity tool 104 and one or more processors 116 (located downhole, at the surface, or both). A logging truck 102 may suspend a wireline logging tool 104 on a wireline cable 106, and the tool 104 may include one or more induction transceivers 300, depth sensors, temperature sensors, pressure sensors, and the like that facilitate collection of downhole measurements for reservoir monitoring. Use of the induction transceiver 300 in such an environment enables elimination of coil windings and active electronic components, such as amplifiers, from downhole antennas, without sacrificing performance. On the surface, a computer 108 acquires and stores measurement data from the tool 104 as a function of axial position along the borehole 406 and optionally as a function of azimuth. Though shown as an integrated part of the logging truck 102, the computer 108 can take different forms including a tablet computer, laptop computer, desktop computer, and virtual cloud computer, and the computer 108 executes software to carry out necessary processing and enable a user to view and interact with a display of the resulting information. Specifically, a processor coupled to memory and located at the surface may execute the software.

The software may collect the data and organize it in a file or database stored on non-transient information storage media, and the software may respond to user input via a keyboard or other input mechanism to display data as an image or movie on a monitor or other output mechanism such as a printer. Furthermore, the software may process the data to optimize field operations as described below. In this way, a multi-dimensional representation of the reservoir may be obtained, processed, and displayed. In addition, the software may issue an audio or visual alert to direct the user's attention to a particular location, result, or piece of data. In at least one embodiment, the tool 104 itself may include the processor coupled with memory to obtain, store, and process measurement data downhole. In another embodiment, processors both at the surface and downhole may work together or independently to obtain, store, and process measurement data.

In some aspects, systems, methods, and apparatuses for implementing induction transceivers are provided according to one or more of the following examples. In a first example, an induction transceiver system includes a magnetic core and an insulator surrounding the magnetic core. The system further includes a cylindrically-shaped sleeve, substantially surrounding the insulator, which includes a gap along the length of the cylindrically-shaped sleeve. A potential difference is measured across the gap when receiving, and a current is applied across the gap when transmitting.

In a second example, a permanent electromagnetic ("EM") monitoring method includes running a casing string into a borehole 406. The casing string includes at least one transceiver including a cylindrically-shaped sleeve. The sleeve includes a gap along the length of the sleeve. A potential difference is measured across the gap when receiving. The method further includes establishing communication between a well interface system and the at least one transceiver. The method further includes employing the at least one transceiver to transmit and/or receive EM signals over time.

In a third example, an induction transceiver includes a magnetic core and an insulator surrounding the magnetic core. The transceiver includes a cylindrically-shaped sleeve, substantially surrounding the insulator, including a gap along the length of the cylindrically-shaped sleeve. A potential difference is measured across the gap when receiving, and a current is applied across the gap when transmitting.

In a fourth example, an induction transceiver includes a magnetic core, an insulator surrounding the magnetic core, and a cylindrically-shaped sleeve, substantially surrounding the insulator. The sleeve includes a gap along the length of the sleeve, and a potential difference is measured across the gap when receiving. A current is applied across the gap when transmitting.

The following features may be incorporated into the various embodiments described above, such features incorporated either individually in or conjunction with one or more of the other features. The transducer may responds to a voltage across the gap. The transducer may be an electro-restrictive material that deforms in response to a voltage across the gap. The optical fiber may be coupled to the electro-restrictive material, and the electro-resistive material may strain the optical fiber when deformed. The transducer may be a light-emitting diode ("LED"), and the optical fiber may be coupled to the LED through which an intensity of the LED may be measured. The electro-magnetic activity of a hydrocarbon reservoir may be monitored. The induction transceiver may be disposed on a well casing. The induction transceiver may be included in a downhole tool such as a resistivity tool, a logging-while-drilling tool, included in a well casing string, or fastened externally to a well casing string. The induction transceiver may be coupled to, or may include, a voltage module that supplies and modulates the current applied across the gap. The gap may be parallel to a cylindrical axis of the sleeve. The transducer, coupled to the sleeve, may be interrogated using an optical fiber. Interrogating the transducer may include measuring a strain on the optical fiber caused by the transducer. Interrogating the transducer may include measuring an intensity of light within the optical fiber caused by the transducer. The EM signals may be used to update a reservoir model. The sleeve may include a conductive non-magnetic metal. The sleeve may include copper, copper alloy, or steel. The magnetic core may include a resistive and magnetically permeable material. The magnetic core may include a ferrite, mu-metal, permalloy, or metal glass. The insulator may include a resistive, non-magnetic, low permittivity material.

While the present disclosure has been described with respect to a limited number of embodiments, those skilled in the art will appreciate numerous modifications and variations therefrom. It is intended that the appended claims cover all such modifications and variations.

What is claimed is:

1. An induction transceiver system comprising:
   a magnetic core;
   an insulator surrounding the magnetic core;
   a cylindrically-shaped sleeve, substantially surrounding the insulator, comprising a gap along the length of the cylindrically-shaped sleeve; and
   leads, coupled to separate sides of the gap, that measure a potential difference across the gap when the induction transceiver system is receiving electromagnetic signals.

2. The induction transceiver system of claim 1, further comprising:
   an optical fiber coupled to the induction transceiver system; and
   a transducer coupled to the optical fiber, wherein the transducer comprises at least one of,
      an electro-restrictive material that deforms to strain the optical fiber in response to a voltage across the gap; and
      a light-emitting diode ("LED"), wherein the optical fiber is to measure an intensity of the LED.

3. The induction transceiver system of claim 1, wherein the system is included in a downhole tool such as a resistivity tool or a logging-while-drilling tool, included in a well casing string, or fastened externally to a well casing string.

4. The induction transceiver system of claim 1, wherein a current is applied across the gap when transmitting.

5. The induction transceiver system of claim 4, further comprising a voltage module that supplies and modulates the current applied across the gap.

6. A method comprising:
   running a downhole tool into a borehole, the downhole tool including at least one transceiver comprising a cylindrically-shaped sleeve comprising a gap along the length of the cylindrically-shaped sleeve;
   establishing communication between a well interface system and the at least one transceiver;
   employing the at least one transceiver to transmit and/or receive electromagnetic ("EM") signals over time; and
   measuring a potential difference across the gap when the at least one transceiver transmits and/or receives EM signals over time.

7. The method of claim 6, further comprising interrogating a transducer with an optical fiber, wherein the transducer is coupled to the cylindrically-shaped sleeve.

8. The method of claim 7, wherein interrogating the transducer comprises measuring a strain on the optical fiber caused by the transducer.

9. The method of claim 7, wherein interrogating the transducer comprises measuring an intensity of light within the optical fiber caused by the transducer.

10. The method of claim 6, further comprising using received EM signals to update a reservoir model.

11. An induction transceiver comprising:
    a magnetic core;
    an insulator surrounding the magnetic core;
    a cylindrically-shaped sleeve, substantially surrounding the insulator, comprising a gap along the length of the cylindrically-shaped sleeve; and
    leads, coupled to separate sides of the gap, that measure a potential difference across the gap when the induction transceiver is receiving electromagnetic signals, and wherein the leads apply a current across the gap when the induction transceiver is transmitting.

12. The induction transceiver of claim 11, wherein the sleeve comprises a conductive non-magnetic metal.

13. The induction transceiver of claim 11, wherein the sleeve comprises copper, copper alloy, or steel.

14. The induction transceiver of claim 11, wherein the magnetic core comprises a resistive and magnetically permeable material.

15. The induction transceiver of claim 11, wherein the magnetic core comprises a ferrite, mu-metal, permalloy, or metal glass.

16. The induction transceiver of claim 11, wherein the insulator comprises a resistive, non-magnetic, low permittivity material.

17. The induction transceiver of claim 11,
    wherein the induction transceiver is coupled to an optical fiber coupled to the induction transceiver, and
    wherein the induction transducer comprises at least one of
       an electro-restrictive material that deforms to strain the optical fiber in response to a voltage across the gap and
       a light-emitting diode ("LED"), wherein the optical fiber is to measure an intensity of the LED.

18. The induction transceiver of claim 11, wherein the induction transceiver is included in a downhole tool such as a resistivity tool or a logging-while-drilling tool, included in a well casing string, or fastened externally to a well casing string.

19. The induction transceiver of claim 11, further comprising a voltage module that supplies and modulates the current applied across the gap when transmitting.

* * * * *